US009737062B2

(12) United States Patent
Takamatsu et al.

(10) Patent No.: US 9,737,062 B2
(45) Date of Patent: Aug. 22, 2017

(54) ROLLER CLUTCH FOR FISHING REEL AND SPINNING REEL

(71) Applicant: Shimano Inc., Sakai, Osaka (JP)

(72) Inventors: Takuji Takamatsu, Osaka (JP); Kei Saito, Osaka (JP)

(73) Assignee: Shimano, Inc., Osaka (JP)

(*) Notice: Subject to any disclaimer, the term of this patent is extended or adjusted under 35 U.S.C. 154(b) by 339 days.

(21) Appl. No.: 14/464,417

(22) Filed: Aug. 20, 2014

(65) Prior Publication Data

US 2015/0090821 A1 Apr. 2, 2015

(30) Foreign Application Priority Data

Sep. 27, 2013 (JP) ................................. 2013-201595

(51) Int. Cl.
| *A01K 89/01* | (2006.01) |
| *A01K 89/02* | (2006.01) |
| *A01K 89/027* | (2006.01) |
| *F16D 41/067* | (2006.01) |
| *F16D 41/064* | (2006.01) |

(52) U.S. Cl.
CPC .......... *A01K 89/02* (2013.01); *A01K 89/0117* (2013.01); *A01K 89/027* (2013.01); *F16D 41/064* (2013.01); *F16D 41/067* (2013.01)

(58) Field of Classification Search
CPC A01K 89/01; A01K 89/0117; A01K 89/0118; A01K 89/01901
See application file for complete search history.

(56) References Cited

U.S. PATENT DOCUMENTS

| 4,392,840 A | * | 7/1983 | Radocaj | ................ | F16H 7/1272 |
| | | | | | 474/117 |
| 4,828,085 A | * | 5/1989 | Lederman | ............. | F16D 41/067 |
| | | | | | 192/45.014 |
| 5,119,919 A | * | 6/1992 | Iga | ........................ | F16D 41/067 |
| | | | | | 192/45.012 |
| 5,265,706 A | * | 11/1993 | Iga | ........................ | F16D 41/067 |
| | | | | | 192/42 |

(Continued)

FOREIGN PATENT DOCUMENTS

| EP | 1 642 497 A2 | 4/2006 |
| JP | 6-24473 U | 4/1994 |

(Continued)

OTHER PUBLICATIONS

European Search Report of corresponding EP Application No. 14 18 5911.6 dated Feb. 24, 2015.

(Continued)

*Primary Examiner* — Emmanuel M Marcelo
(74) *Attorney, Agent, or Firm* — Global IP Counselors, LLP

(57) ABSTRACT

A roller clutch includes an outer ring, an inner ring, a roller, a first spring member, a retainer, and a protrusion portion. The roller is disposed between the inner ring and the outer ring and is movable between a transmitting position and a non-transmitting position. The retainer has a roller holding space holding the roller and a support section supporting the first spring member. The protrusion portion is configured to regulate the movement of the roller, and resist the biasing force of the first spring member at a predetermined position.

10 Claims, 4 Drawing Sheets

(56) References Cited

U.S. PATENT DOCUMENTS

| | | | | |
|---|---|---|---|---|
| 5,370,330 | A | * | 12/1994 | Uehara ............... A01K 89/0117 242/247 |
| 5,503,343 | A | * | 4/1996 | Hirano ............... A01K 89/0117 242/247 |
| 5,779,015 | A | * | 7/1998 | Murata ................ F16D 41/066 192/42 |
| 5,878,972 | A | * | 3/1999 | Okada ................. A01K 89/033 242/247 |
| 5,947,397 | A | * | 9/1999 | Hitomi ................. A01K 89/01 242/231 |
| 6,056,222 | A | * | 5/2000 | Hitomi ............... A01K 89/0117 192/45.008 |
| 6,338,402 | B1 | * | 1/2002 | Muramatsu ........... F16D 41/067 192/45.011 |
| 6,568,516 | B2 | * | 5/2003 | Kemp, III ............... F16D 41/08 192/45.008 |
| 6,997,295 | B2 | * | 2/2006 | Pederson .............. F16D 41/069 192/41 A |
| 2002/0017441 | A1 | | 2/2002 | Kemp, III |
| 2002/0063180 | A1 | * | 5/2002 | Matsuda ............ A01K 89/0117 242/247 |
| 2003/0146321 | A1 | * | 8/2003 | Chang ................ A01K 89/0117 242/247 |
| 2009/0057461 | A1 | * | 3/2009 | Hayashi ................ F16D 41/067 242/247 |

FOREIGN PATENT DOCUMENTS

| | | |
|---|---|---|
| JP | 10-276638 A | 10/1998 |
| JP | 2000-14291 A | 1/2000 |
| WO | 2011/118500 A1 | 9/2011 |

OTHER PUBLICATIONS

Office Action of corresponding Japanese Application No. 2013-201595 dated Apr. 25, 2017.

* cited by examiner

ROLLER CLUTCH FOR FISHING REEL AND SPINNING REEL

CROSS-REFERENCE TO RELATED APPLICATIONS

This application claims priority to Japanese Patent Application No. 2013-201595, filed on Sep. 27, 2013. The entire disclosure of Japanese Patent Application No. 2013-201595 is hereby incorporated herein by reference.

BACKGROUND

Field of Invention

The present invention relates to a roller clutch used in a fishing reel and a spinning reed using the same.

Background Information

A roller clutch of a fishing reel is comprised of an outer ring, an inner ring, and a roller and the rotation can be transmitted only in one direction. For example, when the roller moves to the transmitting position, the rotation of the inner ring is transmitted to the outer ring, and when the roller moves to the non-transmitting position, the rotation of the inner ring is not transmitted to the outer ring. A roller clutch configured as described above can be used in a fishing reel and can be used, for example, in a spinning reel that has a rotor and a brake member like that shown in Japanese Unexamined Patent Application Publication No. 2000-014291.

When using the roller clutch with the above-mentioned configuration in a spinning reel, the outer ring of the roller clutch is attached to the brake member, and the inner ring of the roller clutch is attached to the rotor. The spinning reel equipped with this roller clutch is configured for the roller to be moved to the non-transmitting position when the rotor rotates in the fishing line winding direction and for the roller to move to the transmitting position when the rotor rotates in the fishing line releasing direction.

SUMMARY

As described above, the roller moves to the transmitting position when releasing fishing line, and the rotation of the inner ring is transmitted to the outer ring. That is, the rotation of the rotor is transmitted to the brake member, and the brake member rotates together with the rotor. Here, even the roller clutch rotates identically; therefore, the roller of the roller clutch is moved to the non-transmitting position by centrifugal force and takes on a state in which the rotation of the inner ring is not transmitted sufficiently to the outer ring (a state of insufficient transmission torque). Furthermore, there is a concern that, in the worst case, slipping of the inner ring will result when there is a high-speed rotation.

The object of the present invention is to provide a roller clutch of a fishing reel capable of transmitting the rotation of the inner ring to the outer ring and to prevent unintended slipping of the inner ring.

The roller clutch of a fishing reel according to the first aspect of the present invention is a roller clutch of a fishing reel capable of transmitting the rotation only in one direction and is comprised of an outer ring, an inner ring, a roller, an biasing member, a retainer, and a regulating part. The outer ring has an inner circumferential surface that includes a cam surface formed from a tilted surface. The inner ring has an outer circumferential surface and is disposed on the inner circumferential side of the outer ring. The roller is disposed between the inner ring and the outer ring and is movable between a transmitting position and a non-transmitting position. The transmitting position is the position in which the roller is wedged between the cam surface of the outer ring and the outer circumferential surface of the inner ring. The non-transmitting position is the position in which the roller is not wedged. The biasing member is configured to bias the roller to the transmitting position. The retainer has a roller holding space holding the roller and a support section supporting the biasing member. The regulating part is configured to regulate the movement of the roller, which resists the biasing force of the biasing member at a predetermined position.

According to the configuration described above, the movement of the roller is regulated at the predetermined position by the regulating part even if the roller moves to the non-transmitting position side by resisting the biasing force with centrifugal force. Therefore, even if the roller moves to the non-transmitting position according to centrifugal force, the rotation of the inner ring can be transmitted to the outer ring, and unintended slipping of the inner ring can be prevented.

Preferably, the regulating pa is configured by at least one portion of the support section.

Preferably, the support section has a housing portion that houses the first end side of the biasing member and a protrusion portion that protrudes to the transmitting position side in the circumferential direction. The regulating part is formed by this protrusion portion. According to this configuration, the protrusion portion protrudes to the transmitting position side. Therefore, even if the roller moves to the non-transmitting position side, the roller makes contact with the protrusion portion at the predetermined position and cannot move beyond this predetermined position.

Preferably, the support section has an inner circumferential side wall section and an outer circumferential side wall section that demarcate the housing portion. Furthermore, the protrusion portion is formed at the end part on the transmitting position side of the outer circumferential side wall section. According to this configuration, a protrusion portion is formed on the outer circumferential side. Therefore, the movement of the roller according to centrifugal force can be more surely regulated.

Preferably, the transmitting position and the non-transmitting position are adjacent to each other in the circumferential direction.

The spinning reel according to the second aspect of the present invention is comprised of a rotor, a brake member, and one of the roller clutches of the fishing reel described above. The rotor can rotate around the rotational axis. The brake member can rotate around the rotational axis. The roller clutch of a fishing reel stops and transmits the rotation of the rotor to the brake member.

Preferably, the inner ring is attached to the rotor.

Preferably, the rotor has a boss part. The inner ring has a through-hole where the boss part is engaged.

Preferably, the spinning reel is further equipped with a brake operation member capable of applying brakes to the rotation of the brake member. The outer ring is attached to the brake member.

Preferably, the roller is positioned at the transmitting position when the rotor rotates in the fishing line releasing direction.

According to the present invention, the rotation of the inner ring can be transmitted to the outer ring, and unintended slipping of the inner ring can be prevented.

As described above, according to the present invention, the wear of the brake shoe of the braking operation lever installed on the rotor braking device can be suppressed while expanding the adjustment range of the braking force. Additionally, the elastic member disposed in the braking operation lever is prevented from falling out.

DETAILED DESCRIPTION OF THE INVENTION

Figure 1:
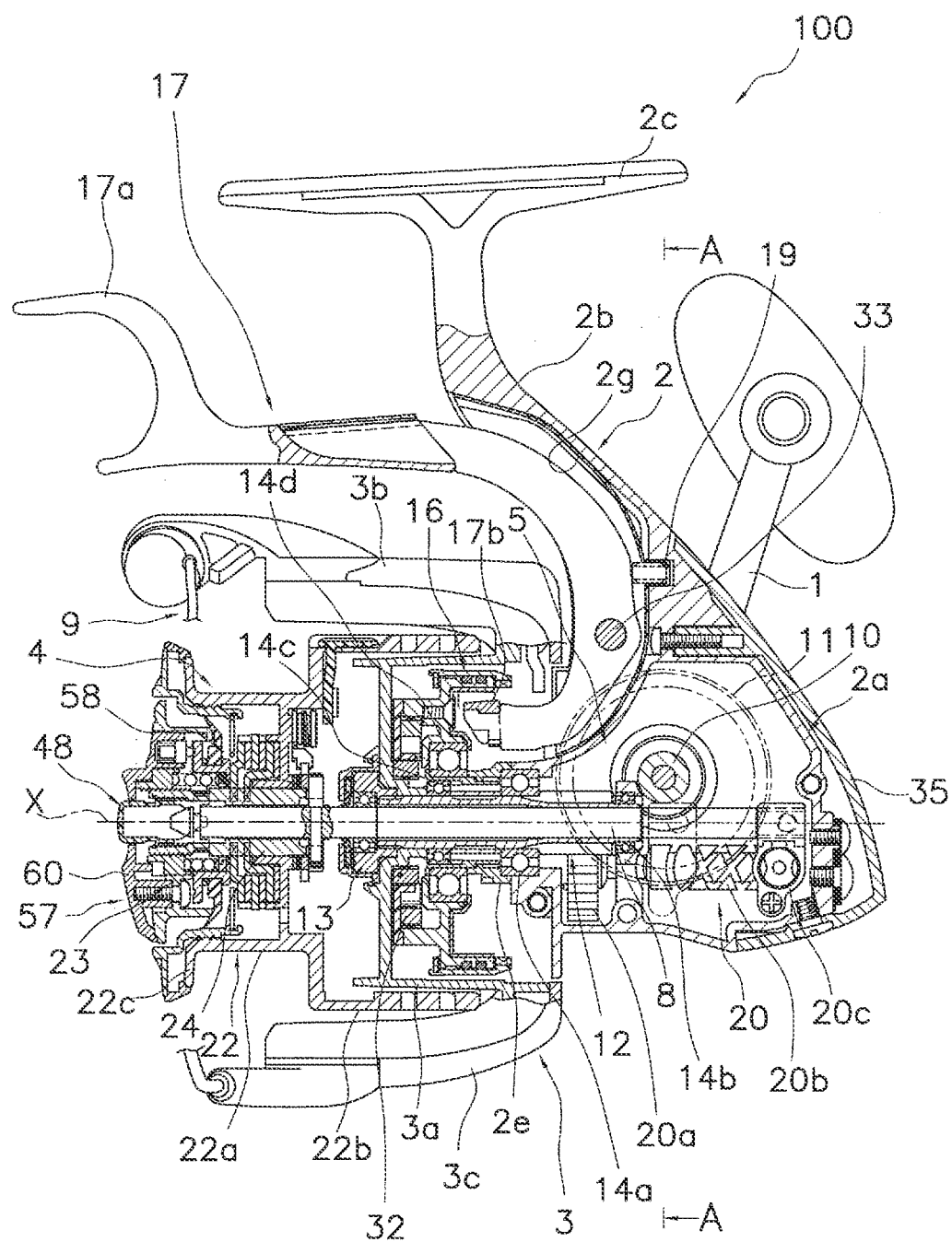
FIG. 1 is a side cross-sectional view of a spinning reel.

Below, an embodiment of the roller clutch used in a fishing reel related to the present invention will be described while referring to the drawings. FIG. 1 is a side cross-sectional view of the spinning reel related to the present embodiment.

As illustrated in FIG. 1, the spinning reel 100 related to the present embodiment is a lever brake spinning reel. This spinning reel 100 is comprised of a reel body 2, a rotor 3, a spool 4, a brake member 16, a braking lever (a brake operation member) 17, and a roller clutch 32.

Figure 2:
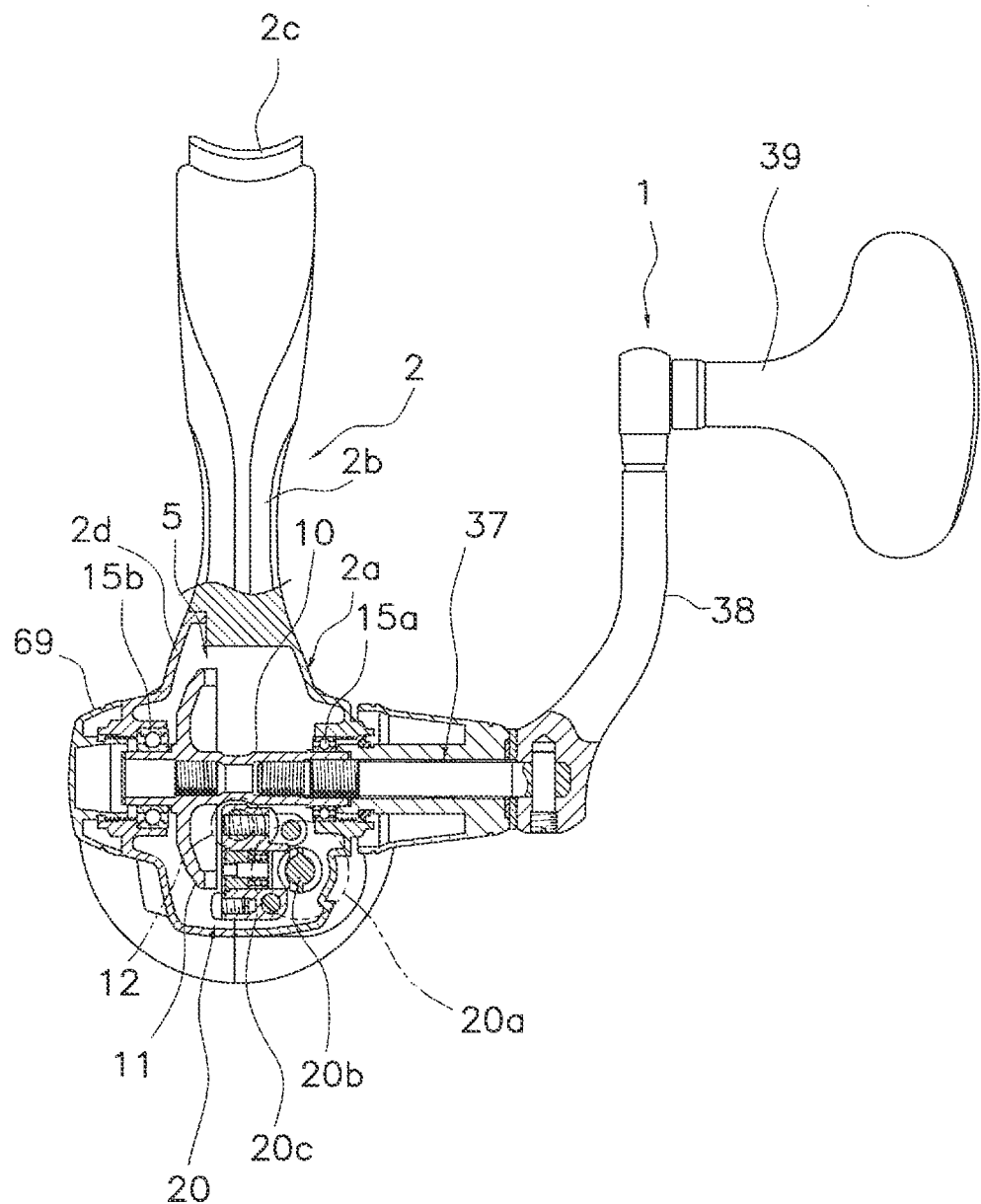
FIG. 2 is an A-A line cross-sectional view in FIG. 1.

As illustrated in FIG. 1 and FIG. 2, the reel body 2 is comprised of a housing portion 2a, a leg portion 2b, and a fishing pole mounting portion 2c. The housing portion 2a, the leg portion 2b, and the fishing pole mounting portion 2c are integrally formed. The housing portion 2a has a space on the inside, and the side section of the housing portion 2a is opened. This opening of the housing portion 2a is covered with a lid member 2d.

As illustrated in FIG. 1, a cylindrical attaching member 2e is mounted to the front portion of the housing portion 2a. The rear portion of the reel body 2 is covered by a guard member 35. A mounting groove 2g for housing the braking lever 17 is formed on the front surface of the leg portion 2b. The mounting groove 2g is formed such that the cross section as viewed from the side is a substantially crescent-shaped.

As illustrated in FIG. 2, the handle assembly 1 is fixed to the master gear shaft 10 described below. Specifically, the handle assembly 1 includes a screw shaft 37, a handle arm 38, and a handle 39.

The extreme end part of the screw shaft 37 is screwed to the master gear shaft 10. The handle arm 38 is attached so as to be foldable relative to the screw shaft 37. The handle 39 is mounted to the extreme end part of the handle arm 38 to rotate around an axis that is parallel to the screw shaft 37. The handle assembly 1 can be attached either at the right position illustrated in FIG. 2 or at the left position on the opposite side. A cap member 69 is mounted to the reel body 2 disposed at a position that is on the opposite side from the position where the handle assembly 1 is attached.

As illustrated in FIG. 1, a rotor drive mechanism 5 and an oscillating mechanism 20 are disposed inside of the housing portion 2a. The rotor drive mechanism 5 is a mechanism for rotating the rotor 3 in conjunction with the rotation of the handle assembly 1. The oscillating mechanism 20 is a mechanism for moving the spool 4 back and forth in conjunction with the rotation of the handle assembly 1.

The rotor 3 can rotate around the rotational axis X and is rotatably supported by the reel body 2. The rotor 3 is comprised of a cylindrical portion 3a and first and second arm parts 3b and 3c. The first arm part 3b and the second arm part 3c are disposed at the sides of the cylindrical portion 3a. The first arm part 3b is disposed on the oppose side from the second arm part 3c. Also, a bail arm 9 is pivotally disposed at the extreme end part of the first arm part 3b and the extreme end part of the second arm part 3c. A fishing line is guided to the spool 4 by this bail arm 9.

Figure 3:
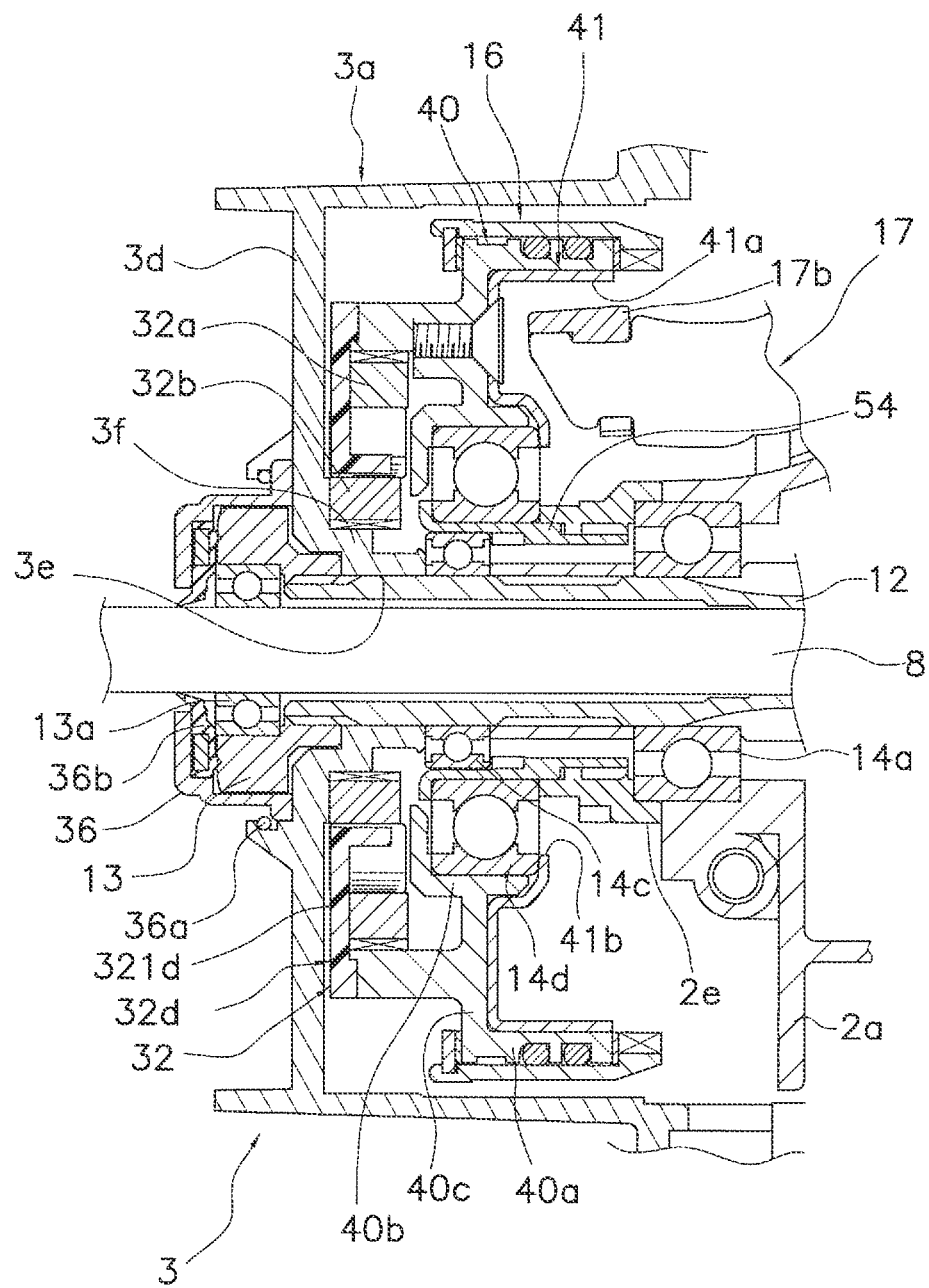
FIG. 3 is an enlarged cross-sectional view showing the structure inside of the rotor.

FIG. 3 is an enlarged cross-sectional view illustrating the details of one portion of the rotor. As illustrated in FIG. 3, the cylindrical portion 3a of the rotor 3 has a front wall 3d. A boss part 3f that has a through-hole 3e is formed at the center part of the front wall 3d so as to extend rearward. The spool shaft 8 and the pinion gear 12 described below penetrate this through-hole 3e. A pair of engagement surfaces is formed on the outer circumferential surface of the boss part 3f. This pair of engagement surfaces engages with the pair of engagement surfaces 321b formed on the inner circumferential surface of the inner ring 32b of the roller clutch 32 described below.

As illustrated in FIG. 1, the spool 4 is disposed between the first arm part 3b and the second arm part 3c of the rotor 3. The spool 4 is mounted to the extreme end part of the spool shaft 8. The spool 4 includes a spool body 22, a drag mechanism 23, and a support member 24.

The spool body 22 includes a fishing line winding cylinder 22a, a skirt 22b, and a flange 22c. The fishing line winding cylinder 22a has a cylindrical shape. The skirt 22b has a cylindrical shape with a larger diameter than the fishing line winding cylinder 22a and extends rearward from the fishing line winding cylinder 22a. The flange 22c extends in the radial direction from the front end of the fishing line winding cylinder 22a.

The drag mechanism 23 is disposed inside of the spool body 22. The drag mechanism 23 includes a drag adjustment part 57 that has a drag knob and a friction part 58 that is pressurized by the drag adjustment part 57. The drag adjustment part 57 adjusts the drag force by being screwed to the extreme end of the spool shaft 8. The friction part 58 has a drag washer rotatably coupled to the support member 24 and a drag washer non-rotatably coupled to the support member 24.

The support member 24 is non-rotatably mounted to the spool shaft 8 and rotatably supports the spool body 22. The support member 24 can be attached and detached with one touch from the spool shaft 8 together with the spool body 22 and the drag mechanism 23 according to the one-touch detachment mechanism 48.

As illustrated in FIG. 1 and FIG. 2, the rotor drive mechanism 5 includes a master gear shaft 10, a master gear 11, and a pinion gear 12. The master gear shaft 10 is attached with the handle assembly 1 as described above and integrally rotates with the handle assembly 1. The master gear shaft 10 is formed into a cylindrical shape. The master gear shaft 10 is rotatably supported by a bearing 15a attached to the housing portion 2a and a bearing 15b attached to the lid member 2d. The master gear 11 is integrally formed with the master gear shaft 10 and rotates together with the master gear shaft 10.

The pinion gear 12 is formed into a cylindrical shape and meshes with the master gear 11 at the rear part (the right end part in FIG. 1). The front part (the left end part in FIG. 1) of the pinion gear 12 penetrates the through-hole 3e of the rotor 3 and extends to the spool 4 side. The rotor 3 is fixed to the front part of this pinion gear 12 according to a nut 13 to rotate integrally. The pinion gear 12 is rotatably supported by the housing portion 2a via the bearings 14a, 14b, and 14c.

As illustrated in FIG. 3, the nut 13 is locked by a locking member 36. Also, the nut 13 is rotatably supported by the spool shaft 8 via a bearing 13*a*. Accordingly, a gap is formed between the inner circumferential surface of the pinion gear 12 and the outer circumferential surface of the spool shaft 8. The locking member 36 is engaged with the front wall 3*d* by a retainer spring 36*a*. Also, a seal member 36*b* formed from an elastic member is mounted to the locking member 36. This seal member 36*b* prevents liquids from infiltrating into the rotor 3 from the gap between the spool shaft 8 and the pinion gear 12.

As illustrated in FIG. 1 and FIG. 2, the oscillating mechanism 20 is comprised of a middle gear 20*a*, a threaded shaft 20*b*, and a slider 20*c*. The middle gear 20*a* meshes with the pinion gear 12. The threaded shaft 20*b* can rotate integrally with the middle gear 20*a* and can rotate around an axis that is parallel to the spool shaft 8. The slider 20*c* moves back and forth according to the rotation of the threaded shaft 20*b*. The rear end part of the spool shaft 8 is attached to the slider 20*c*.

As illustrated in FIG. 3, the brake member 16 is a substantially cylindrical shaped member and is housed in the cylindrical portion 3*a* of the rotor 3. The brake member 16 has a cylindrical member 40 and a brake cylinder 41.

The cylindrical member 40 is comprised of an outer cylindrical section 40*a*, an inner cylindrical section 40*b*, and a disc section 40*c*. The outer cylindrical section 40*a* is housed in the cylindrical portion 3*a* of the rotor 3. The outer cylindrical section 40*a* has a cylindrical shape and is disposed to be concentric to the cylindrical portion 3*a* of the rotor 3. The inner cylindrical section 40*b* has a cylindrical shape with a smaller diameter than that of the outer cylindrical section 40*a* and is disposed to be concentric to the outer cylindrical section 40*a*. Also, the inner cylindrical section 40*b* is rotatably supported by the outer circumferential surface of the bearing retainer ring 54 fixed to the attaching member 2*e* via a bearing 14*d*. The disc section 40*c* couples the outer cylindrical section 40*a* and the inner cylindrical section 40*b*.

The bearing retainer ring 54 is fixed to the inner circumferential surface at the extreme end part of the attaching member 2*e*. A bearing 14*c* is disposed between the bearing retainer ring 54 and the pinion gear 12. The bearing 14*c* fulfills a function of supporting the pinion gear 12 as well as retaining the bearing retainer ring 54.

The brake cylinder 41 is fixed to the inner circumferential surface of the cylindrical member 40. The brake cylinder 41 extends from the inner circumferential surface of the outer cylindrical section 40*a* toward the rear surface of the bearing 14*d* through the inner cylindrical section 40*b*. Therefore, the outer ring of the bearing 14*d* is disposed between the cylindrical member 40 and the brake cylinder 41.

The brake cylinder 41 is a metal cylindrical member with a closed bottom that has a center hole 41*b* and is screwed to the disc section 40*c*. The inner circumferential surface of the brake cylinder 41 in the section parallel to the outer cylindrical section 40*a* forms the brake surface 41*a*. Brakes are applied to the brake member 16 with the brake shoe 17*b* of the braking lever 17 making contact with the braking surface 41*a* of this brake cylinder 41.

Figure 4:
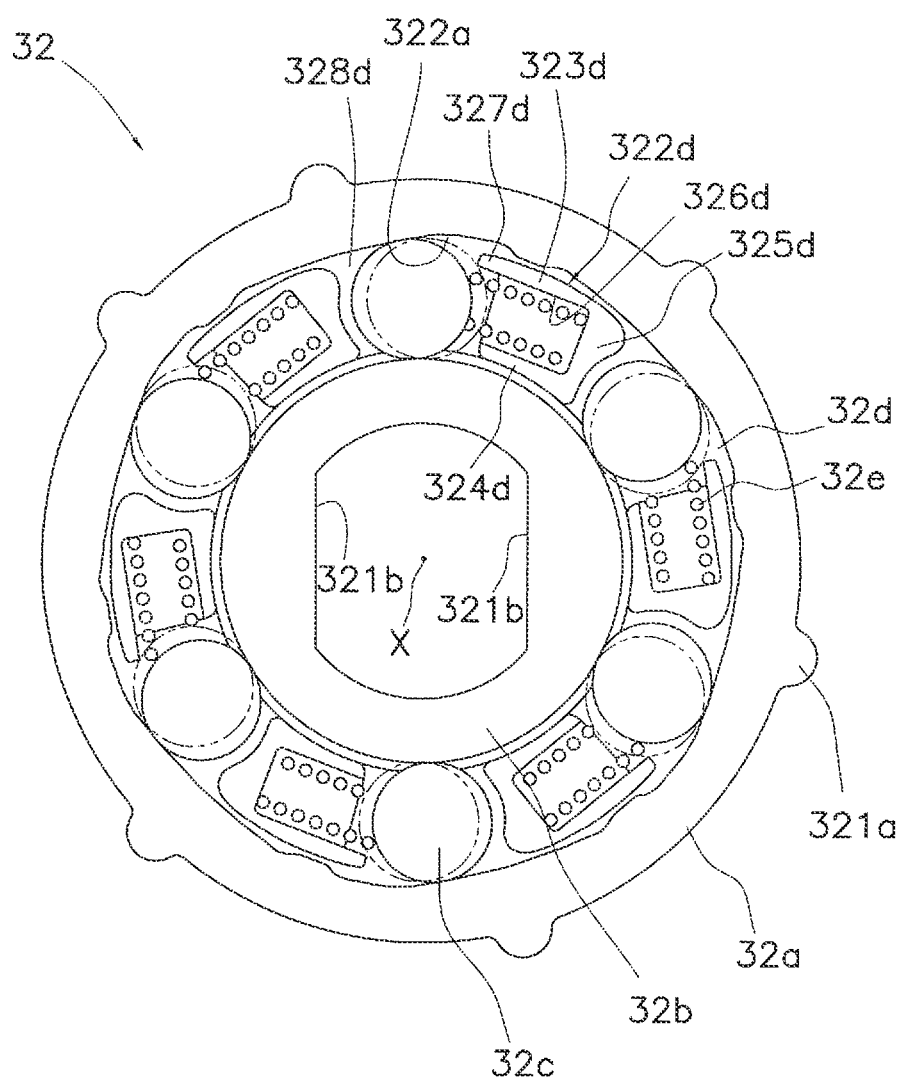
FIG. 4 is a frontal cross-sectional view of a roller clutch.

FIG. 4 is a frontal cross-sectional view illustrating a roller clutch 32. As illustrated in FIG. 3 and FIG. 4, the roller clutch 32 is comprised of an outer ring 32*a*, an inner ring 32*b*, multiple rollers 32*c*, a retainer 32*d*, and multiple first spring member (one example of the biasing members) 32*e*.

The outer ring 32*a* is attached to the brake member 16. Specifically, the outer ring 32*a* is attached to the cylindrical member 40 of the brake member 16. The outer ring 32*a* has a substantially cylindrical shape and has multiple convex portions 321*a* on the outer circumferential surface. The concave portions 321*a* extend along the rotational axis X and are formed with spacing therebetween in the circumferential direction. The concaved portions 321*a* engage with the convex portions formed to the brake member 16. As a result, the outer ring 32*a* is attached to the brake member 16, and the outer ring 32*a* integrally rotates with the brake member 16.

The outer ring 32*a* has multiple cam surfaces 322*a* on the inner circumferential surface. The cam surfaces 322*a* are formed according to the tilted surfaces and the minor diameter changes along the circumferential direction. Specifically, the cam surfaces 322*a* are tilted toward the clockwise direction in FIG. 4 such that they separate from the rotational axis X.

The inner ring 32*b* is disposed on the inner circumferential side of the outer ring 32*a* and is attached to the rotor 3. Specifically, the inner ring 32*b* is attached to the boss part 3*f* of the rotor 3. A pair of engagement surfaces 321*b* is formed on the inner circumferential surface of the inner ring 32*b*. The inner ring 32*b* integrally rotates with the rotor 3 by the engagement surfaces 321*b* of the inner ring 32*b* engaging with the engagement surface of the boss part 3*f*.

The rollers 32*c* have a cylindrical shape and extend along the rotational axis X. The rollers 32*c* are disposed between the outer ring 32*a* and the inner ring 32*b* and can move between the transmitting position and the non-transmitting position. The rollers 32*c* are biased to the transmitting position side by the first spring members 32*e*.

When the rollers 32*c* move to the transmitting position (the position indicated with the solid line in FIG. 4), the rollers are wedged between the cam surface 322*a* of the outer ring 32*a* and the outer circumferential surface of the inner ring 32*b*. As a result, the rotation of the inner ring 32*b* is transmitted to the outer ring 32*a*. On the other hand, when the rollers 32*c* move to the non-transmitting position (the position indicated with the line that has an alternating long and two short dashes in FIG. 4), autorotation of the rollers 32*c* is possible between the outer ring 32*a* and the inner ring 32*b*. As a result, the rotation of the inner ring 32*b* is not transmitted to the outer ring 32*a*. When the inner ring 32*b* rotates counterclockwise in FIG. 4, the rollers 32*c* move to the transmitting position. On the other hand, the rollers 32*c* move to the non-transmitting position by resisting the biasing force of the first spring members 32*e* when the inner ring 32*b* rotates clockwise in FIG. 4.

The retainer 32*d* has a body section 321*d* and multiple support sections 322*d*. The retainer 32*d* also has a roller holding space 328*d* between the adjacent support sections 322*d*. The rollers 32*c* are held in the roller holding spaces 328*d* to be movable in the circumferential direction. The body section 321*d* has a disc shape with an opening at the center and is fixed to the brake member 16 at the outer circumferential part.

The support sections 322*d* are configured to support the first spring members 32*e* and are formed to the body section 321*d* with spacing in between in the circumferential direction. The support sections 322*d* are formed from an outer circumferential side wall section 323*d*, an inner circumferential side wall section 324*d*, and a bottom wall section 325*d*. The housing portion 326*d* is demarcated by wall parts 323*d*-325*d*. The first spring members 32*e* are housed in the housing portions 326*d*. The extreme end parts of the first spring members 32*e* protrude from the housing portion 326*d*, and these extreme end parts pressurize the rollers 32*c*.

The outer circumferential side wall sections 323*d* have a protrusion portion 327*d*. The outer circumferential side wall section 323d and the protrusion portion 327d are integrally formed. The length of the outer circumferential side wall sections 323d in the circumferential direction is substantially the same as that of the inner circumferential side wall sections 324d. The protrusion portion 327d protrudes to the transmitting position side in the circumferential direction. Namely, the protrusion portion 327d protrudes in the counterclockwise direction in FIG. 4. The length of this protrusion portion 327d in the circumferential direction is not restricted in particular and can, for example, be about ≥0.8 mm and ≤1.2 mm. Also, the protrusion portion 327d is positioned more to the outer circumferential side than the center of the rollers 32c in the radial direction. Accordingly, the rollers 32c are effectively prevented from moving to the outer circumferential side by centrifugal force or the like. The aforementioned protrusion portion 327d corresponds to the regulating part in the present invention. Also, the radial direction refers to the radial direction of the circle with the rotational axis X as the center, and the circumferential direction refers to the circumferential direction of the circle with the rotational axis X as the center.

As illustrated in FIG. 1, the braking lever 17 is formed substantially into the shape of the letter C, there is an operating part 17a at the top side end part, and there is a brake shoe 17b at the bottom side end part. This braking lever 17 is supported rotatably with the support shaft 33 as the center by the support shaft 33 mounted to the leg portion 2b of the reel body 2. The braking lever 17 is biased to the forward side by the second spring member 19. Namely, the braking lever 17 is biased in the counterclockwise direction with the support shaft 33 as the center in FIG. 1. Accordingly, the brake shoe 17b does not make contact with the braking surface 41a of the brake member 16 during a state in which the braking lever 17 is not being operated. Also, the brake shoe 17b pressurizes the braking surface 41a of the brake member 16 and stops the rotation of the brake member 16 by operating the braking lever 17 and rotating in the clockwise direction in FIG. 1.

The spinning reel 100 configured as described above operates as follows. First, the bail arm 9 is pushed down to the fishing line releasing side when casting, and the fishing line is released from the outer circumference of the spool 4 by casting. When winding the fishing line, the bail arm 9 is returned to the fishing line winding position according to a return mechanism not illustrated in the drawings when the handle assembly 1 is rotated in the fishing line winding direction. The rotational force of the handle assembly 1 is transmitted to the pinion gear 12 via the master gear shaft 10 and the master gear 11. The rotational force transmitted to the pinion gear 12 is transmitted to the rotor 3 via the front part 12a of the pinion gear 12. At this time, the rotor 3 rotates in the fishing line winding direction. Therefore, the rotation of the inner ring 32b of the roller clutch 32 is not transmitted to the outer ring 32a. Namely, the rotation of the rotor 3 is not transmitted to the brake member 16.

When the fishing line is pulled by a fish and the rotor 3 reverses to the fishing line releasing direction, the rotation of the inner ring 32b of the roller clutch 32 is transmitted to the outer ring 32a. Therefore, the rotation of the rotor 3 is transmitted to the brake member 16 via the roller clutch 32. Here, applying a brake to the brake member 16 by operating the braking lever 17 is possible, and the rotational speed of the rotor 3 can be adjusted.

The roller clutch 32 related to the present embodiment has the following characteristics.

Even if the rollers 32c are moved to the non-transmitting position side by resisting the biasing force of the first spring members 32e with a centrifugal force, the movement of the rollers 32c is regulated at the predetermined position by the protrusion portion 327d. Namely, the rollers 32c are regulated to move more in the clockwise direction from the position indicated by the line that has an alternating long and then two short dashes in FIG. 4. Accordingly, the rollers 32c that were moved to the non-transmitting position side by centrifugal force can easily return to the transmitting position, and the unintended slipping of the inner ring 32b can be prevented.

Other Embodiments

While embodiments of the present invention are described above, the present invention is not limited to the embodiments described above, and various modifications are possible in a scope of not deviating from the essence of the invention. For example, while the protrusion portion 327d can be formed at the extreme end of the outer circumferential side wall section 323d in the embodiments described above, the invention is not limited to this structure. For example, the protrusion portion 327d can be formed at the extreme end of the inner circumferential side wall section 324d.

What is claimed is:
1. A roller clutch for a fishing reel capable of transmitting the rotation only in one direction, the roller clutch comprising:
   an outer ring having an inner circumferential surface, the inner circumferential surface including a earn surface formed from a tilted surface;
   an inner ring having an outer circumferential surface and being disposed on an inner circumferential side of the outer ring;
   a roller disposed between the inner ring and the outer ring, and movable between a transmitting position and a non-transmitting position, the transmitting position is a position in which the roller is wedged between the cam surface of the outer ring and the outer circumferential surface of the inner ring, and a non-transmitting position is a position in which the roller is not wedged;
   a biasing member configured to bias the roller to the transmitting position;
   a retainer having a roller holding space holding the roller, and a support section supporting the biasing member; and
   a regulating pail extending from an outer circumferential side wall of the support section of the retainer and disposed between the biasing member and the inner circumferential surface of the outer ring, and configured to regulate movement of the roller, which resists the biasing force of the biasing member at a predetermined position.
2. The roller clutch of the fishing reel according to claim 1, wherein
   the regulating part is formed as a part of the support section.
3. The roller clutch of the fishing reel according to claim 2, wherein
   the support section has a housing portion housing a first end side of the biasing member and, a protrusion portion protruding toward the transmitting position in a circumferential direction, and
   the regulating part is formed by the protrusion portion.
4. The roller clutch of the fishing reel according to claim 3, wherein the support section has an inner circumferential side wall section and an outer circumferential side wall section demarcating the housing portion, and the protrusion portion is disposed at an end part on a transmitting position side of the outer circumferential side wall section.

5. The roller clutch of the fishing reel according to claim 1, wherein the transmitting position and the non-transmitting position are adjacent to each other in the circumferential direction.

6. A spinning reel comprising a rotor configured to rotate around a rotational axis;

a brake member configured to rotate around the rotational axis; and a roller clutch of the fishing reel according to claim 1 configured to block and transmit the rotation of the rotor to the brake member.

7. The spinning reel according to claim 6, wherein the inner ring is attached to the rotor.

8. The spinning reel according to claim 7, wherein the rotor has a boss part, and the inner ring is attached to the boss part of the rotor, and has a through-hole where the boss part is attached.

9. The spinning reel according to claim 7, wherein the roller is disposed at the transmitting position when the rotor rotates in a fishing line releasing direction.

10. A spinning reel comprising:

a rotor configured to rotate around a rotational axis;

a brake member configured to rotate around the rotational axis; and a roller clutch configured to block and transmit the rotation of the rotor to the brake member, the roller clutch including an outer ring having an inner circumferential surface, the inner circumferential surface including a cam surface formed from a tilted surface, an inner ring having an outer circumferential surface and being disposed on an inner circumferential side of the outer ring, a roller disposed between the inner ring and the outer ring, and movable between a transmitting position and a non-transmitting position, the transmitting position is a position in which the roller is wedged between the cam surface of the outer ring and the outer circumferential surface of the inner ring, and a non-transmitting position is a position in which the roller is not wedged, a biasing member configured to bias the roller to the transmitting position;

a retainer having a roller holding space holding the roller, and a support section supporting the biasing member, and a regulating part configured to regulate movement of the roller, which resists the biasing force of the biasing member at a predetermined position; and a brake operation member configured to apply brakes to the rotation of the brake member, the outer ring being attached to the brake member.

* * * * *